(12) United States Patent
Chao et al.

(10) Patent No.: US 7,237,127 B2
(45) Date of Patent: Jun. 26, 2007

(54) PORTABLE ELECTRONIC DEVICE AND POWER CONTROL METHOD THEREOF

(75) Inventors: Chun-Sheng Chao, Taoyuan County (TW); Ching-Tsung Lai, Taoyuan County (TW); Chung-An Chien, Taoyuan County (TW)

(73) Assignee: High Tech Computer, Corp., Taoyuan (TW)

( * ) Notice: Subject to any disclaimer, the term of this patent is extended or adjusted under 35 U.S.C. 154(b) by 383 days.

(21) Appl. No.: 10/650,983

(22) Filed: Aug. 29, 2003

(65) Prior Publication Data

US 2004/0230851 A1   Nov. 18, 2004

(30) Foreign Application Priority Data

May 15, 2003 (TW) .................................. 92113169

(51) Int. Cl.
   G06F 1/26     (2006.01)
   G06F 1/32     (2006.01)

(52) U.S. Cl. .................. 713/320; 713/323; 713/324; 713/340

(58) Field of Classification Search ................ 713/300, 713/310, 320, 321, 323, 324, 340
   See application file for complete search history.

(56) References Cited

U.S. PATENT DOCUMENTS 5,485,623 A * 1/1996 Kurokawa et al. ............ 714/22
5,765,001 A * 6/1998 Clark et al. .................. 713/340
5,784,628 A * 7/1998 Reneris ....................... 713/300
5,832,285 A * 11/1998 Shimada ...................... 713/323
5,884,087 A * 3/1999 White et al. ................. 713/310
6,131,166 A * 10/2000 Wong-Insley ............... 713/300
6,243,831 B1 * 6/2001 Mustafa et al. ............... 714/24
6,266,776 B1 * 7/2001 Sakai .......................... 713/300
6,324,651 B2 * 11/2001 Kubik et al. ................. 713/323
6,609,182 B1 * 8/2003 Pedrizetti et al. ........... 711/159
6,611,919 B1 * 8/2003 Matsuya et al. ............. 713/320
6,848,057 B2 * 1/2005 Hicok ......................... 713/320
6,851,012 B2 * 2/2005 Yamashima ................. 711/101
6,883,037 B2 * 4/2005 Kadatch et al. ............... 710/5
2002/0138669 A1 * 9/2002 Kadatch et al. ............... 710/5
2003/0009702 A1 * 1/2003 Park ........................... 713/300
2003/0149866 A1 * 8/2003 Neuman et al. ............... 713/1

* cited by examiner

Primary Examiner—Rehana Perveen
Assistant Examiner—James F. Sugent
(74) Attorney, Agent, or Firm—Birch, Stewart, Kolasch & Birch, LLP (57) ABSTRACT

A power control method for a portable electronic device. The portable electronic device comprises a power supply unit and a volatile memory for storing data when the power supply unit supplies power thereto. First, the portable electronic device is set to enter a deep sleep mode. Then, data accessed from the volatile memory is transferred to a non-volatile memory. Finally, except for maintaining sufficient power to restore the device, the power supply unit is turned off.

22 Claims, 5 Drawing Sheets

PORTABLE ELECTRONIC DEVICE AND POWER CONTROL METHOD THEREOF

This nonprovisional application claims priority under 35 U.S.C. § 119(a) on Patent Application No(s). 92113169 filed in TAIWAN on May 15, 2003, which is(are) herein incorporated by reference.

BACKGROUND OF THE INVENTION

1. Field of the Invention

The present invention relates to a portable electronic device and particularly to a power control method for a portable electronic device.

2. Description of the Prior Art

One important function of portable electronic devices is to process and store data for users. For increasing the use time of a portable electronic device, if the portable electronic device is not used for a long period, it enters a sleep mode wherein most components of the portable electronic device, besides those needed to recover and a volatile memory to store information, are stopped. Similarly, to secure data, when power supply, such as a battery, is less than a predetermined amount, the portable electronic device enters sleep mode to decrease power requirements.

TABLE A

| Condition | Percentage of total power |
|---|---|
| Power of other circuits in sleep mode | 25% |
| Power of SDRAM in sleep mode | 75% |
| 3.8 V DC-in in sleep mode | 100% |

Referring to Table A, some power is required in sleep mode. Important information, such as security settings, is stored in the volatile memory. Without power, the volatile memory cannot retain data. In sleep mode, power for retaining data constitutes the majority of the total power consumed of the portable electronic device and reaches 75%. The advantage of sleep mode is the short response time to return to work. In portable electronic devices not used for long periods, however, power consumed in quick recovery is not economical.

In current portable electronic devices, when remaining battery supply is 20%, the portable electronic device automatically enters sleep mode, retaining data in the volatile memory for at least 72 hours. data stored in the volatile memory is lost when the power is exhausted, thereby inconveniencing users.

SUMMARY OF THE INVENTION

The object of the present invention is to provide a power control method for a portable electronic device, in which, when power supply is less than a predetermined amount, data stored in a volatile memory is transferred to a non-volatile memory, thereby decreasing power requirements of the portable electronic device while enabling indefinite data storage.

In the power control method for a portable electronic device, users control the time when data accessed from the volatile memory is transferred to the non-volatile memory, thereby enhancing user convenience.

The present invention provides a power control method for a portable electronic device. The portable electronic device comprises a power supply unit and a volatile memory for storing data when the power supply unit supplies power thereto. First, the portable electronic device is set to enter a sleep mode utilizing less power than in the Prior Art (herein referred to as a "deep sleep mode"). Then, data accessed from the volatile memory is transferred to a non-volatile memory. Finally, except for maintaining power required to restore the device, the power supply unit is turned off. The procedure for entering deep sleep mode further comprises determining whether the portable electronic device has been used within a preset period, whether the remaining power supply is less than a predetermined amount, or whether a specific input signal has been received by the portable electronic device. When any of these determinations returns a positive result, it is further determined whether available space in the non-volatile memory is sufficient for data to be transferred from the volatile memory. If so, the portable electronic device is set to enter a deep sleep mode.

In addition, after the portable electronic device enters deep sleep mode, it is determined whether the remaining power supply is sufficient to support normal device operation and whether a specific input signal has been received by the portable electronic device. When either of these determinations returns a positive result, normal operations are restored automatically. After restoration, normal power supply is resumed. Data is accessed from the non-volatile memory to initiate operations.

Furthermore, the present invention also provides a portable electronic device. The portable electronic device comprises a power supply unit, a processor, a volatile memory, a non-volatile memory and a management unit. The processor processes data when the power supply unit supplies power thereto. The volatile memory, coupled to the processor stores data when power is supplied thereto. The management unit enters the portable electronic device into a deep sleep mode. In deep sleep mode, wherein data accessed from the volatile memory is transferred to the non-volatile memory, and, except for maintaining sufficient power to restore the device, the management unit turns off the power supply.

The present invention also provides an electronic system. The electronic system comprises a portable electronic device and a non-volatile memory. The portable electronic device comprises a power supply unit, a processor, a volatile memory, a connection interface and a management unit. The connection interface is coupled to the non-volatile memory. The processor processes data when the power supply unit supplies power thereto. The management unit enters the portable electronic device into a deep sleep mode. In deep sleep mode, wherein data accessed from the volatile memory is transferred to the non-volatile memory through the connection interface, and, except for maintaining sufficient power to restore the device, the management unit turns off the power supply.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only and thus not intended to be limitative of the present invention.

DETAILED DESCRIPTION OF THE INVENTION

The invention provides a power control method for a portable electronic device, such as a PDA (Personal Digital Assistant), a mobile phone, or other mobile devices.

Figure 1A:
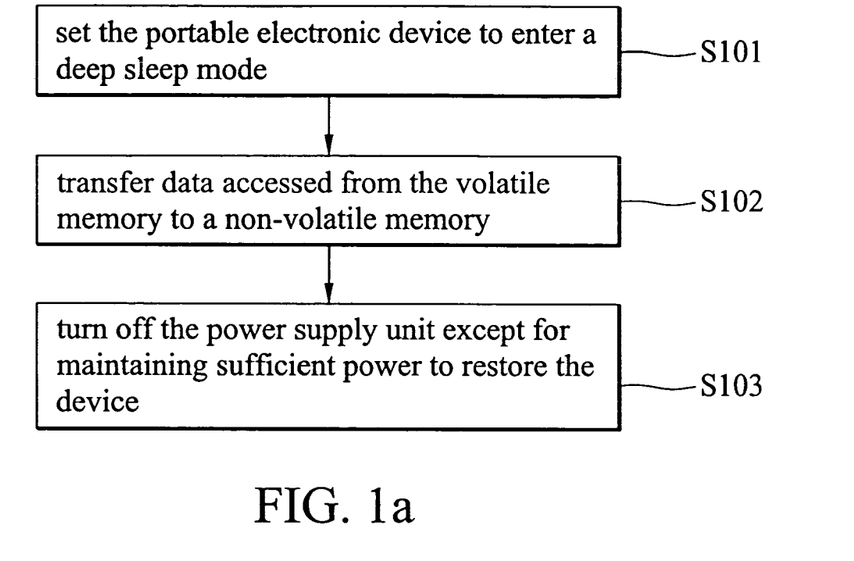
FIG. 1a shows a flowchart of a power control method for a portable electronic device in the present invention.

FIG. 1a shows a flowchart of a power control method for a portable electronic device in the present invention. The portable electronic device comprises a power supply unit and a volatile memory for storing data when the power supply unit supplies power thereto. First, the portable electronic device is set to enter a deep sleep mode (S101). Then, data accessed from the volatile memory is transferred to a non-volatile memory (S102). Finally, except for maintaining sufficient power to restore the device, the power supply unit is turned off (S103), thereby reducing power requirements.

Figure 1B:
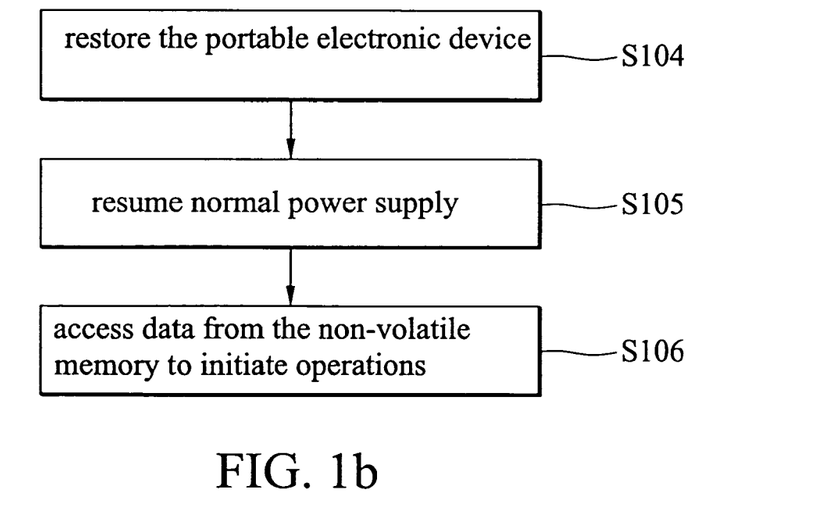
FIG. 1b is a flowchart illustrating the procedure after the portable electronic device enters deep sleep mode in the present invention.

FIG. 1b is a flowchart illustrating the procedure after the portable electronic device enters deep sleep mode in the present invention. After the portable electronic device enters deep sleep mode, the portable electronic device may be restored (S104), after which normal power supply is resumed (S105). Finally, data is accessed from the non-volatile memory to initiate operations (S106).

The PDA is used as an example to illustrate the following embodiments.

Figure 2A:
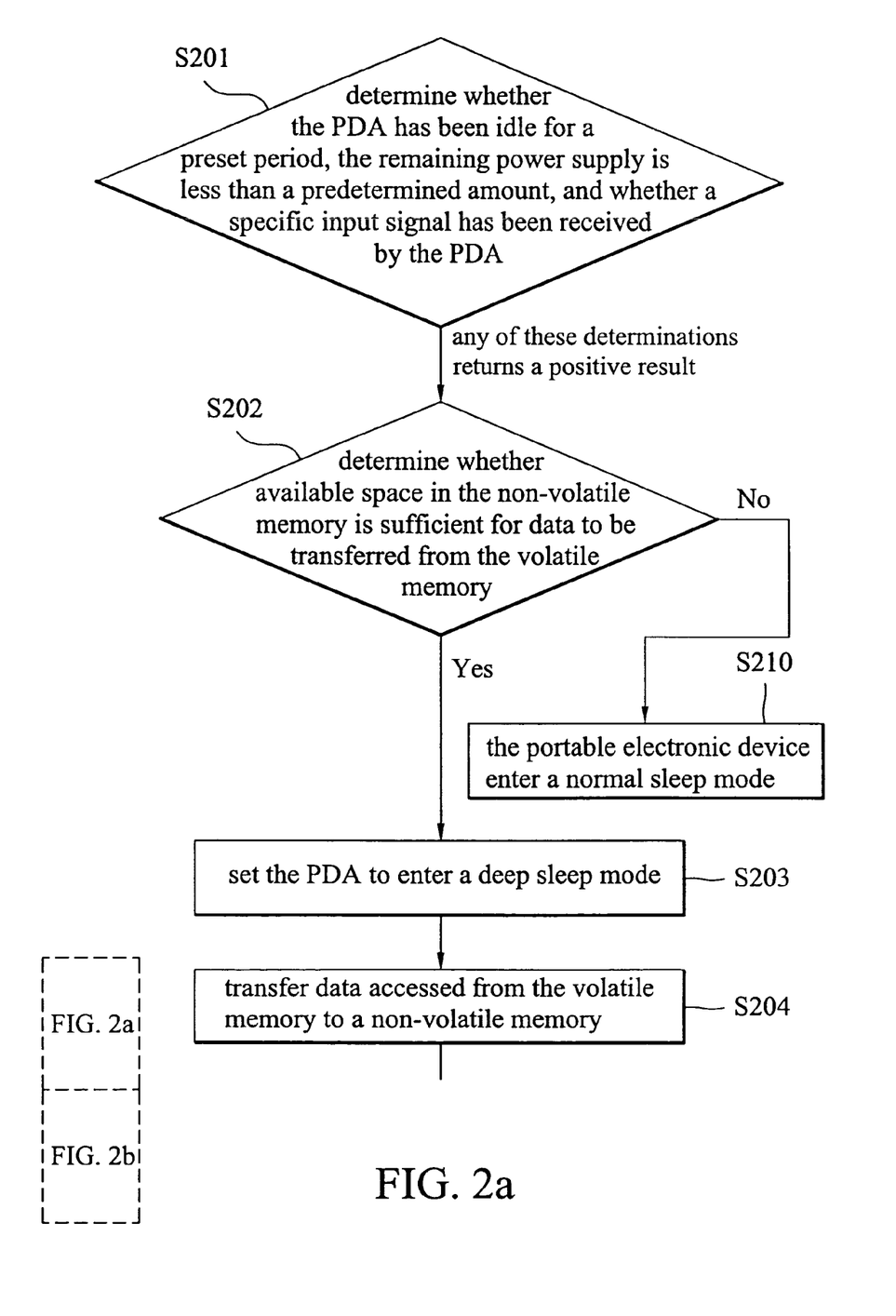
FIG. 2a and FIG. 2b are flowcharts of the power control method according to the present invention.
Figure 2B:
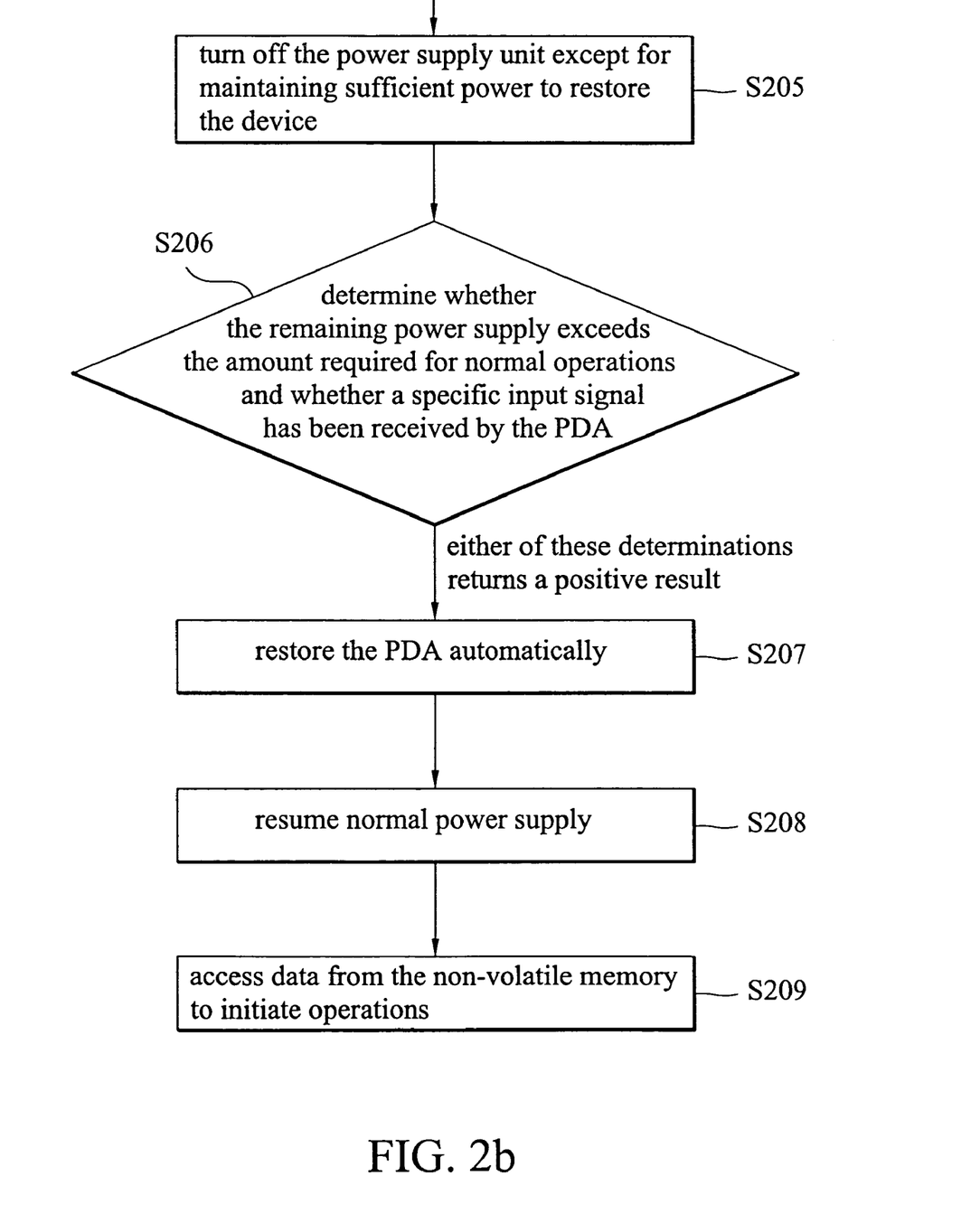

FIG. 2a and FIG. 2b. are flowcharts of the power control method according to the present invention. The PDA using the power control method comprises a power supply unit, such as a battery, and a volatile memory for storing data when the power supply unit supplies power thereto. First, it is determined whether the PDA has been idle for a preset period, the remaining power supply is less than a predetermined amount, and whether a specific input signal has been received by the PDA (S201). If the power of the power supply unit is low, there may be insufficient reserve for the volatile memory to store data. Thus, the predetermined amount is set in accordance with the hardware design of the PDA. In addition, a specific input signal to initiate the following procedure is predefined by users.

If any of these determinations returns a positive result, it is further determined whether available space in the non-volatile memory is sufficient for data to be transferred from the volatile memory (S202). If so, the PDA is set to enter a deep sleep mode (S203). If not, the portable electronic device enters a normal sleep mode, retaining data in the volatile memory (S210).

Then, data accessed from the volatile memory is transferred to the non-volatile memory (S204). Except for power required to perform the following procedures, the power supply unit is turned off (S205).

Next, whether the remaining power supply exceeds the amount required for normal operations and whether a specific input signal has been received by the PDA is determined (S206). If either of these determinations returns a positive result, the PDA is restored automatically (S207). The specific input signal to restore the PDA is predefined. After the PDA receives the specific input signal from an input device, the PDA is restored.

After the PDA is restored, normal power supply is resumed (S208). data is accessed from the non-volatile memory to initiate operations (S209).

In addition to the above example, conditions determining when the PDA enters deep sleep mode by performing steps S204 and S205 can be preset, such as when the PDA stays in the normal sleep mode longer than a predetermined time, or based on a daily schedule.

Figure 3:
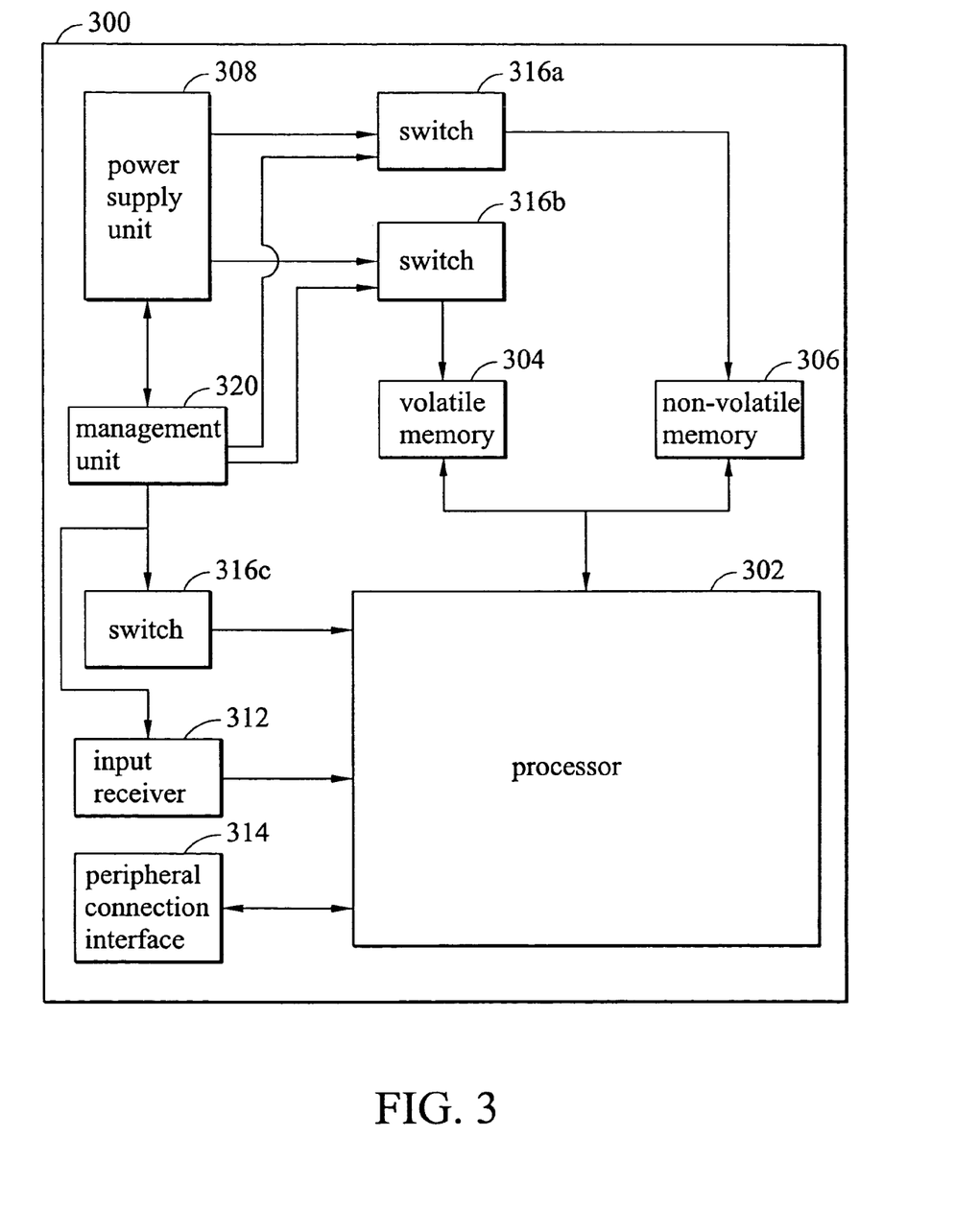
FIG. 3 is a diagram illustrating a configuration of a PDA that performs the procedures shown in FIG. 2a and FIG. 2b.

FIG. 3 is a diagram illustrating a configuration of a PDA that performs the procedures shown in FIG. 2a and FIG. 2b. As shown in FIG. 3, the PDA 300 comprises a processor 302, a volatile memory 304, a non-volatile memory 306, a power supply unit 308, an input receiver 312, a peripheral connection interface 314, switches 316a, 316b and 316c, and a management unit 320. In the embodiment, the non-volatile memory 306 can be a flash memory, a ROM, or other storage media that can retain data without power. The input receiver 312 is coupled to an input device (not shown in FIG. 3) such as a keyboard or a touch panel and receives input signals from the input device. Via the peripheral connection interface 314, the PDA 300 is coupled to other peripheral devices with USB interfaces, RS232 interfaces, wireless connection interfaces, or display interfaces.

The power supply unit 308 supplies power to the PDA 300 for normal operations.

The management unit 320 enters the PDA 300 into deep sleep mode, starting by accessing data from the volatile memory 304 and transferring it to the non-volatile memory 306. The power supply unit 308 stops supplying power to the processor 302, the volatile memory 304 and the non-volatile memory 306 by turning off the switches 316a, 316b and 316c.

In the following procedures, the management unit 320 controls when the PDA 300 enters deep sleep mode. First, the management unit 320 determines whether the PDA 300 has been idle for a preset period, whether the remaining power supply 308 is less than a predetermined amount, and whether a specific input signal has been received by the input receiver 312.

If any of these determinations returns a positive result, space for storing data in the volatile memory 304 is checked. If sufficient space exists for data from the volatile memory 404, the PDA 300 is set to enter deep sleep mode.

The management unit 320 controls restoration of the PDA 300 by determining whether the remaining power supply 308 is sufficient for the PDA 300 to operate normally and whether a specific input signal has been received by the input receiver 312. When either of these determinations returns a positive result, the PDA is restored. By turning on switches 316a, 316b and 316c, the power supply unit 308 supplies power to the processor 302, the volatile memory 304 and the non-volatile memory 306. The management unit 320 instructs the processor 302 to access data from the non-volatile memory 306 to initiate operations. The specific input signal to restore the PDA 300 is predefined. After the input receiver 312 receives the specific input signal from the input device, the PDA 300 is restored.

In addition to the above example, conditions may be set by which the management unit 320 determines the time when the PDA 300 enters deep sleep mode, such as according to a user schedule.

Figure 4:
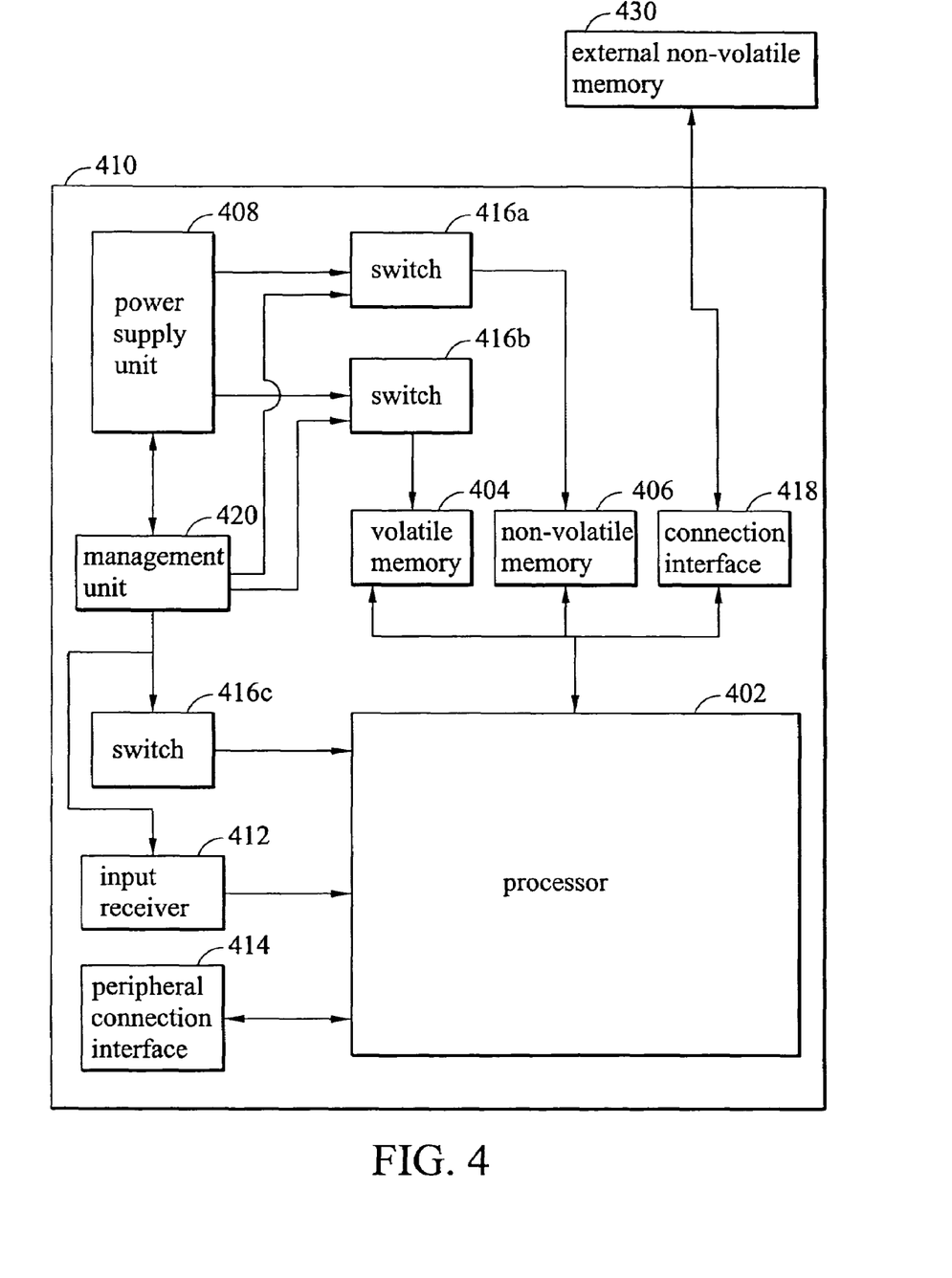
FIG. 4 is a diagram illustrating a configuration of an electronic system that performs the procedures shown in FIG. 2a and FIG. 2b.

FIG. 4 is a diagram illustrating a configuration of an electronic system that performs the procedures shown in FIG. 2*a* and FIG. 2*b*. As shown in FIG. 4, the electronic system 400 comprises a PDA 410 and an external non-volatile memory 430. In the embodiment, the external non-volatile memory 430 can be a flash memory, a ROM or other storage media that can retain data without power.

The PDA 410 comprises a processor 402, a volatile memory 404, a non-volatile memory 406, a power supply unit 408, an input receiver 412, a peripheral connection interface 414, switches 416*a*, 416*b* and 416*c*, a connection interface 418 and a management unit 420. The input receiver 412 is coupled to an input device (not shown in FIG. 4) such as a keyboard or a touch panel and receives input signals therefrom. Via the peripheral connection interface 414, the PDA 410 is coupled to other peripheral devices with USB interfaces, RS232 interfaces, wireless connection interfaces or display interfaces. The non-volatile memory 406 stores a plurality of conditions for the PDA 410 to work normally. Via the connection interface 418, the PDA 410 is coupled to the external non-volatile memory 430. The connection interface 418 may be a USB stick, a PCMCIA interface, a USB box, a MiNiPCI interface or a CardBus interface.

The power supply unit 408 supplies enough power to other components in the PDA 410 to operate normally. When enough power is supplied to the processor 402, the processor 402 can process data and the volatile memory 404 coupled to the processor 402 can store the processed data.

The management unit 420 enters the PDA 410 into deep sleep mode, in which data is accessed from the volatile memory 404 and stored into the external non-volatile memory 430 through the connection interface 418. The power supply unit 408 stops supplying power to the processor 402, the volatile memory 404 and the non-volatile memory 406 by turning off the switches 416*a*, 416*b* and 416*c*.

In the following procedures, the management unit 420 controls entry of the PDA 410 into deep sleep mode. First, the management unit 420 determines whether the PDA 410 has remained idle for a preset period, whether the remaining power supply 408 is less than a predetermined amount, and whether a specific input signal has been received by the input receiver 412.

If any of these determinations returns a positive result available space in the external non-volatile memory 430 is checked. If the available space is sufficient for storing data from the volatile memory 404, the PDA 410 is set to enter deep sleep mode.

The management unit 420 controls restoration of the PDA 410 by determining whether the remaining power supply 408 exceeds that necessary for normal operation of PDA 410 and whether a specific input signal has been received by the input receiver 412. When either of these determinations returns a positive result, the PDA is restored by turning on the switches 416*a*, 416*b* and 416*c*, the power supply unit 408 supplies power to the processor 402, the volatile memory 404, and the non-volatile memory 406. The management unit 420 instructs the processor 402 to access data from the external non-volatile memory 430 to initiate operations.

In addition to the above example, conditions may be set by which the management unit 420 determines the time when the PDA 410 enters deep sleep mode, such as according to a user schedule.

In the power control method for a portable electronic device provided by the invention, when power supply is less than a predetermined amount, data stored in a volatile memory, which requires power to retain data, is transferred to a non-volatile memory, thereby reducing power requirements.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A power control method for a portable electronic device with a power supply unit and a volatile memory for storing data when the power supply unit supplies power thereto, comprising:

checking whether an available space in a non-volatile memory is sufficient for storing data from the volatile memory;

setting the portable electronic device to enter a deep sleep mode if the available space in the non-volatile memory is sufficient;

storing data accessed from the volatile memory into the non-volatile memory;

maintaining only sufficient power to restore the device during the deep sleep mode; and setting the portable electronic device to enter a normal sleep mode if the available space in the non-volatile memory is not sufficient, wherein data stored in the volatile memory is retained.

2. The power control method as claimed in claim 1 further comprising:

restoring the device;

turning on the power supply unit to resume all power; and accessing data from the non-volatile memory to initiate operations.

3. The power control method as claimed in claim 1, wherein the checking step further comprises:

determining whether the portable electronic device has been used within a preset period; and when the portable electronic device has remained idle for the preset period, checking whether the available space in the non-volatile memory is sufficient for storing data from the volatile memory.

4. The power control method as claimed in claim 1, wherein the checking step further comprises:

determining whether the remaining power supply is less than a predetermined amount; and if the remaining power supply is less than the predetermined amount, checking whether the available space in the non-volatile memory is sufficient for storing data from the volatile memory.

5. The power control method as claimed in claim 1, wherein the checking step further comprises:

determining whether a specific input signal has been received by the portable electronic device; and when the specific input signal has been received by the portable electronic device, checking whether the available space in the non-volatile memory is sufficient for storing data from the volatile memory.

6. The power control method as claimed in claim 2, wherein the restoration step further comprises:
   determining whether the remaining power supply is sufficient to support normal device operation; and
   when the remaining power supply is sufficient to support normal device operation, restoring the device automatically.

7. The power control method as claimed in claim 2, wherein the restoration step further comprises:
   determining whether a specific input signal has been received by the portable electronic device; and
   when the specific input signal has been received by the portable electronic device, restoring the device automatically.

8. A portable electronic device, comprising:
   a power supply unit;
   a processor for processing data when the power supply unit supplies power thereto;
   a volatile memory coupled to the processor, for storing data when the power supply unit supplies power thereto;
   a non-volatile memory; and
   a management unit for entering the portable electronic device into a deep sleep mode when an available space in the non-volatile memory is checked to be sufficient for storing data from the volatile memory, wherein data accessed from the volatile memory is transferred to the non-volatile memory, and, except for maintaining sufficient power to restore the device, the management unit turns off the power supply, and for entering the portable electronic device into a normal sleep mode when the available space in the non-volatile memory is check to be not sufficient for storing data from the volatile memory, wherein data stored in the volatile memory is retained.

9. The portable electronic device as claimed in claim 8, wherein, after restoration, the management unit turns on the power supply unit and instructs the processor to access data from the non-volatile memory to initiate operations.

10. The portable electronic device as claimed in claim 8, wherein, after determining that the portable electronic device has remained idle for a preset period, the management unit checks whether the available space in the non-volatile memory is sufficient for storing data from the volatile memory, and, when the available space in the non-volatile memory is sufficient for storing data from the volatile memory, the management unit enters the portable electronic device into the deep sleep mode.

11. The portable electronic device as claimed in claim 8, wherein, after determining that the remaining power supply is less than a predetermined amount, the management unit checks whether the available space in the non-volatile memory is sufficient for storing data from the volatile memory, and, when the available space in the non-volatile memory is sufficient for storing data from the volatile memory, the management unit enters the portable electronic device into the deep sleep mode.

12. The portable electronic device as claimed in claim 8, wherein, after determining a specific input signal has been received by the portable electronic device, the management unit checks whether the available space in the non-volatile memory is sufficient for storing data from the volatile memory, and, when the available space in the non-volatile memory is sufficient for storing data from the volatile memory, the management unit enters the portable electronic device into the deep sleep mode.

13. The portable electronic device as claimed in claim 9, wherein, after the management unit determines that the remaining power supply is sufficient for the portable electronic device to operate normally, the portable electronic device is restored.

14. The portable electronic device as claimed in claim 9, wherein, after the management unit determines a specific input signal has been received by the portable electronic device, the portable electronic device is restored.

15. An electronic system, comprising:
   a non-volatile memory; and
   a portable electronic device, comprising:
   a connection interface coupled to the non-volatile memory;
   a power supply unit;
   a processor for processing data when the power supply unit supplies power to the processor;
   a volatile memory coupled to the processor, for storing data when the power supply unit supplies power thereto; and
   a management unit for controlling the portable electronic device to enter a deep sleep mode when an available space in the non-volatile memory is checked to be sufficient for storing data from the volatile memory, wherein data accessed from the volatile memory is transferred to the non-volatile memory through the connection interface, and, except for maintaining sufficient power to restore the device, the management unit turns off the power supply, and for controlling the portable electronic device to enter a normal sleep mode when the available space in the non-volatile memory is checked to be not sufficient for storing data from the volatile memory, wherein data stored in the volatile memory is retained.

16. The portable electronic device as claimed in claim 15, wherein, after restoration, the management unit turns on the power supply unit and instructs the processor to access data from the non-volatile memory to initiate operations.

17. The portable electronic device as claimed in claim 15, wherein, after determining the portable electronic device has remained idle for a preset period, the management unit checks whether the available space in the non-volatile memory is sufficient for storing data from the volatile memory, and, when the available space in the non-volatile memory is sufficient for storing data from the volatile memory, the management unit enters the portable electronic device into the deep sleep mode.

18. The portable electronic device as claimed in claim 15, wherein, after determining the remaining power supply is less than a predetermined amount, the management unit checks whether the available space in the non-volatile memory is sufficient for storing data from the volatile memory, and, when the available space in the non-volatile memory is sufficient for storing data from the volatile memory, the management unit enters the portable electronic device into the deep sleep mode.

19. The portable electronic device as claimed in claim 15, wherein, after determining a specific input signal has been received by the portable electronic device, the management unit checks whether the available space in the non-volatile memory is sufficient for storing data from the volatile memory, and, when the available space in the non-volatile memory is sufficient for storing data from the volatile memory, the management unit enters the portable electronic device into the deep sleep mode.

20. The portable electronic device as claimed in claim 16, wherein, after the management unit determines the remaining power supply is sufficient for normal operation, the portable electronic device is restored.

21. The portable electronic device as claimed in claim 16, wherein, after the management unit determines a specific input signal has been received by the portable electronic device, the portable electronic device is restored.

22. The portable electronic device as claimed in claim 15 further comprising:
a second non-volatile memory for storing a plurality of programs for the portable electronic device to work normally.

* * * * *